(12) United States Patent
Klüter et al.

(10) Patent No.: US 6,222,612 B1
(45) Date of Patent: Apr. 24, 2001

(54) PROCESS AND DEVICE FOR THE OUTPUT OF ELECTRONIC IMAGE SIGNALS, AND A PHOTOGRAPHIC COPIER

(75) Inventors: Ulrich Klüter, München; Josef Auer, Unterhaching, both of (DE)

(73) Assignee: AGFA-Gevaert AG, Leverkusen (DE)

(*) Notice: Subject to any disclaimer, the term of this patent is extended or adjusted under 35 U.S.C. 154(b) by 0 days.

(21) Appl. No.: 09/202,196

(22) PCT Filed: Jun. 13, 1997

(86) PCT No.: PCT/EP97/03105

§ 371 Date: Dec. 7, 1998

§ 102(e) Date: Dec. 7, 1998

(87) PCT Pub. No.: WO97/48011

PCT Pub. Date: Dec. 18, 1997

(30) Foreign Application Priority Data

Jun. 14, 1996 (DE) .............................. 196 23 835

(51) Int. Cl.⁷ .......................... G03B 27/52; G03B 27/80; H04N 1/04; H04N 1/46
(52) U.S. Cl. ................. 355/40; 355/27; 355/38; 355/39; 355/72; 358/487; 358/506
(58) Field of Search ............... 355/27, 40, 38, 355/72, 39; 358/506, 487

(56) References Cited

U.S. PATENT DOCUMENTS

| | | | |
|---|---|---|---|
| 4,464,045 | 8/1984 | Findeis et al. ............... | 355/38 |
| 4,566,784 | 1/1986 | Nitsch ........................ | 355/72 |
| 5,029,313 | 7/1991 | Robison et al. ............... | 355/40 |
| 5,084,727 | 1/1992 | Maronian et al. .............. | 355/68 |
| 5,253,011 * | 10/1993 | Zahn et al. .................. | 355/41 |
| 5,382,966 | 1/1995 | Doi ........................... | 346/107 |
| 5,386,263 | 1/1995 | Kotani et al. ................ | 354/403 |
| 5,414,490 * | 5/1995 | Kurokawa et al. .............. | 355/41 |
| 5,424,802 | 6/1995 | Saita ......................... | 355/43 |
| 5,447,811 * | 9/1995 | Buhr et al. ................... | 430/20 |
| 5,447,827 | 9/1995 | Ishikawa et al. ............... | 430/434 |
| 5,471,265 | 11/1995 | Shibata et al. ................ | 354/76 |
| 5,739,897 | 4/1998 | Frick et al. ................... | 355/40 |
| 5,742,362 * | 4/1998 | Chikamichi ................... | 349/2 |
| 5,912,724 * | 6/1999 | Sakaguchi .................... | 355/35 |

FOREIGN PATENT DOCUMENTS

| | | | |
|---|---|---|---|
| 33 39 975 | 3/1988 | (DE) | G03B/27/72 |
| 41 13 594 | 11/1992 | (DE) | H04N/1/10 |
| 38 25 887 | 6/1994 | (DE) | H04N/1/23 |
| 0 020 855 | 3/1983 | (EP) | G03B/27/73 |
| 0 697 628 | 2/1996 | (EP) | G03D/15/00 |
| 0 697 629 | 2/1996 | (EP) | G03D/15/00 |
| 6-19106 | 1/1994 | (JP) . | |

OTHER PUBLICATIONS

Patent Abstracts of Japan, vol. 97, No. 1, p. 1 (attached to JP 822 7107).
Patent Abstracts of Japan, vol. 96, No. 4, p. 1 (attached to JP 731 9078).
*Advanced Photo System Index Printer Based on LED/LCD Exposure System*, Abstracts from Annual Meeting of SOSTJ 1996, pp. 110–112.

* cited by examiner

Primary Examiner—Russell Adams
Assistant Examiner—Khaled Brown
(74) Attorney, Agent, or Firm—Darby & Darby

(57) ABSTRACT

A process and device for the output of electronic image signals on light-sensitive recording material is disclosed. A two-dimensional, transmissive display element, in particular a liquid crystal display (LCD), is controlled by the image signals and the beam of at least one light source passes therethrough in the direction of the light-sensitive recording material. During video output, the display element is arranged so near to the recording material that a sharp picture is produced on the recording material without having to position additional focusing, optical means between the display element and the recording material.

16 Claims, 8 Drawing Sheets

PROCESS AND DEVICE FOR THE OUTPUT OF ELECTRONIC IMAGE SIGNALS, AND A PHOTOGRAPHIC COPIER

BACKGROUND OF THE INVENTION

1. Field of the Invention

The present invention relates to a process and a device for the output of electronic imaging signals, in particular to a process for an output of electronic imaging signals on a light-sensitive recording material in a photographic copying apparatus in which an image master of a photographic film can be copied on light-sensitive recording material. In such system, a transmissive display element, in particular a liquid crystal display (LCD), is controlled by the imaging signals, with a beam of light passing through the display element in the direction of the light-sensitive recording material.

2. Description of the Related Art

Conventional photography based on silver halide film is increasingly replaced by electronic components both on the recording end, e.g. the camera, and also during subsequent processing of the film. For example, modern cameras are capable of recording additional information, such as the date the image was acquired, greeting messages and other information, together with the image on the film inside the camera. Other types of film are provided with a magnetic recording layer on which information is recorded in the camera specifying how the film should be subsequently processed. A film of this type and a corresponding processing procedure is disclosed, for example, in U.S. Pat. No. 5,029,313.

Frequently, customers ask that additional information, such as greeting messages, be printed on or next to the photographic prints after the film is processed. There is also increasing demand to print images in photographic quality on photographic paper directly from an electronic image source, e.g. a computer or a scanner.

More and more often, customers also request from photo finishers so-called index prints. A process to produce index prints is disclosed in U.S. Pat. No. 5,447,827. In this case, all images recorded on a photographic film are also electronically scanned and electronically merged to form a picture which includes every image of the film. Other relevant information, such as an identification number of the film, the number of the image, the exposure date of the image, a motif text and the like, are added to the individual images and the merged image is outputted in form of an index print. This system has a disadvantage that the device for outputting of electronic imaging signals is relatively complex and has a large footprint.

Photographic photo finishing processes are divided into so-called offline index print systems and inline index print systems. In the so-called offline index print system, the index prints are outputted on a separate printer separately from the other photographic prints and then added to the other pictures. An inline index print system, on the other hand, produces the index prints at the same time and with the same device as the individual prints of the photographic film. This device can therefore print conventional images optically on a copying material as well as output electronic imaging signals on the same copying material. The inline index print system has the significant advantage that the index prints are already properly associated with the images of the print order. Consequently, a sorting step is no longer required.

JP 6-19 106 A describes a device for the output of electronic imaging signals on light-sensitive recording material. Image signals are here displayed on a display element and applied directly to the recording material.

DE 38 25 887 C2 describes a video printer for printing different individual images on a common output sheet. The last two references relate to fully electronic systems which cannot be directly integrated with a photographic copying device in which an image master of a photographic film can be optically copied on light-sensitive material.

DE 41 13 594 A1 describes a device for printing leaflets which includes a retractable calibration test pattern.

SUMMARY OF THE INVENTION

It is the object of the invention to provide a process and a device capable of outputting electronic imaging signals with a high, i.e. preferably photographic quality on a light-sensitive recording material, wherein the device is of simple construction and suitable to operate as an inline index print system.

The object is solved in that during an image output, the display element can be positioned so close to the recording material that a sharp image is produced on the recording material, without the need to position additional optical focusing means between the display element and the recording material. Further, for an output of the imaging signals, the display element can be positioned in the same optical beam path in which an image master is also positioned during the copying operation of the image master.

In one aspect of the invention, a transmissive display element is controlled by imaging signals and is irradiated with the beam of at least one light source that passes through the display element in the direction of the light-sensitive recording material. A particularly suitable display element is a liquid crystal display. However, other light valve arrangements with transmission properties that can be controlled pixel by pixel, can also be used. During image output, the display element is located so close to the recording material that a sharp image is produced on the recording material without the need for additional optical focusing means between the display element and the recording material. The display element performs at least approximately a contact exposure. The imaging signals are discrete signals, in particular digitized signals.

The invention is particularly suited to retrofit photographic projection copiers to output electronic imaging signals of images that are composed of pixels. It is only necessary to add a transmissive display element and to modify the electronic control means. In particular, the display element for the output of the electronic image is moved, in particular tilted, into an illuminating position. The copying device can then be switched over from a conventional projection mode wherein a conventional film master is copied on light-sensitive recording material (in particular a color negative film master on a color negative recording paper) to a fully electronic mode wherein electronic imaging signals are outputted to the color negative paper, and vice versa.

The display element can be inserted not only by tilting about a rotation axis, but also, for example, by a linear translatory motion. With this modification, on one hand, an existing light source of the conventional projection copying device can be used to produce a conventional copy and, on the other hand, the same light source can also illuminate the transmissive display element to output the electronic imaging signal on the light-sensitive recording material. Advantageously, the display device is illuminated through a ground glass screen and a zoom objective which is positioned between the light source and the display element. The zoom objective is applied in two ways: to provide a sharp projection of a conventional copy master on the recording material, and also to illuminate the display element with a predetermined divergence. A preferred display element is a liquid crystal display.

When a copier is retrofitted in this manner, the display element is advantageously mechanically operatively connected with a conventional test negative which can be tilted into the illumination beam path if required. The two components then take up a minimal amount of space.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views:

Details and advantageous embodiments of the invention are described in the dependent claims and will be explained in greater detail in the following with reference to several embodiments and the drawings.

Figure 1:
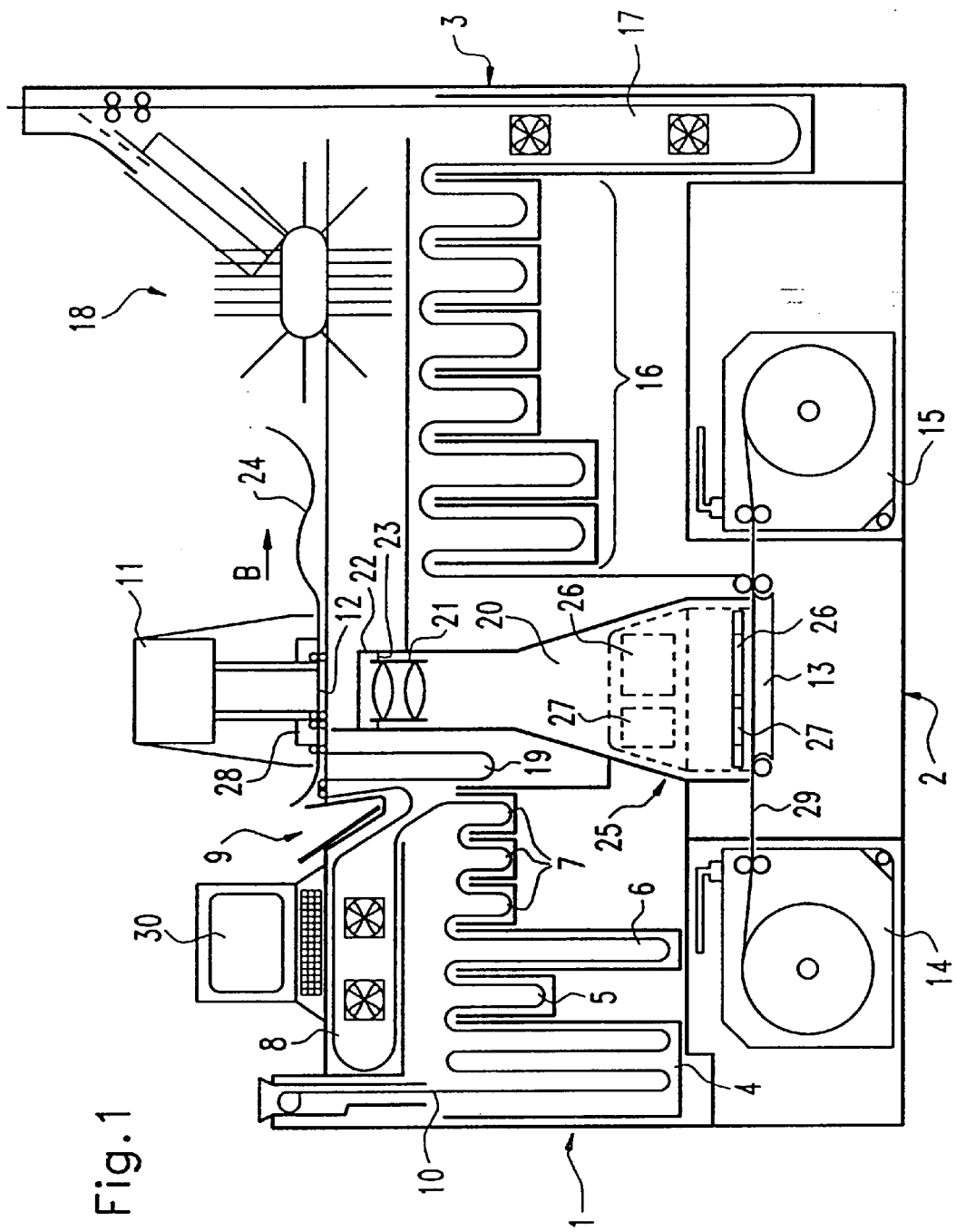
Figure 2:
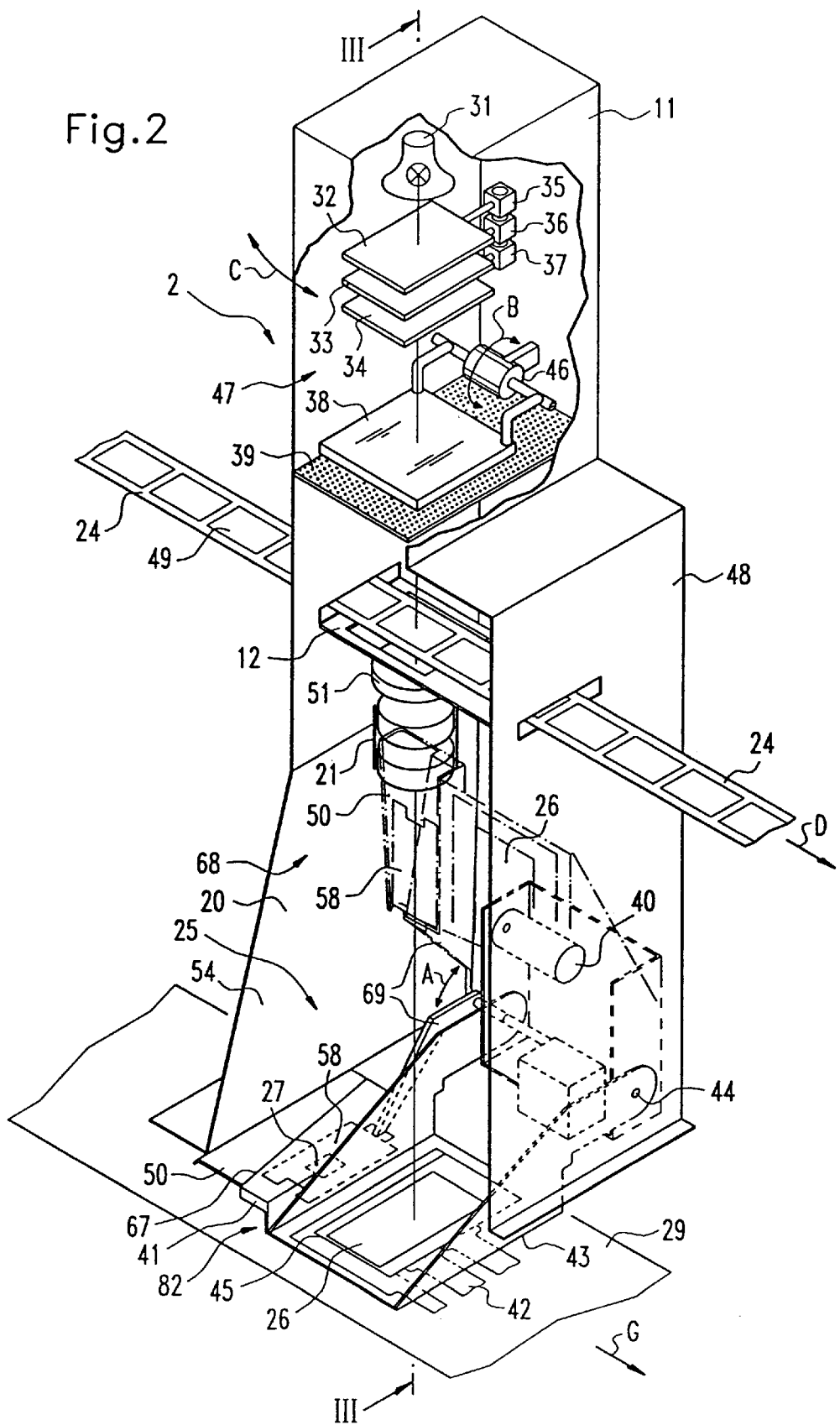
Figure 3:
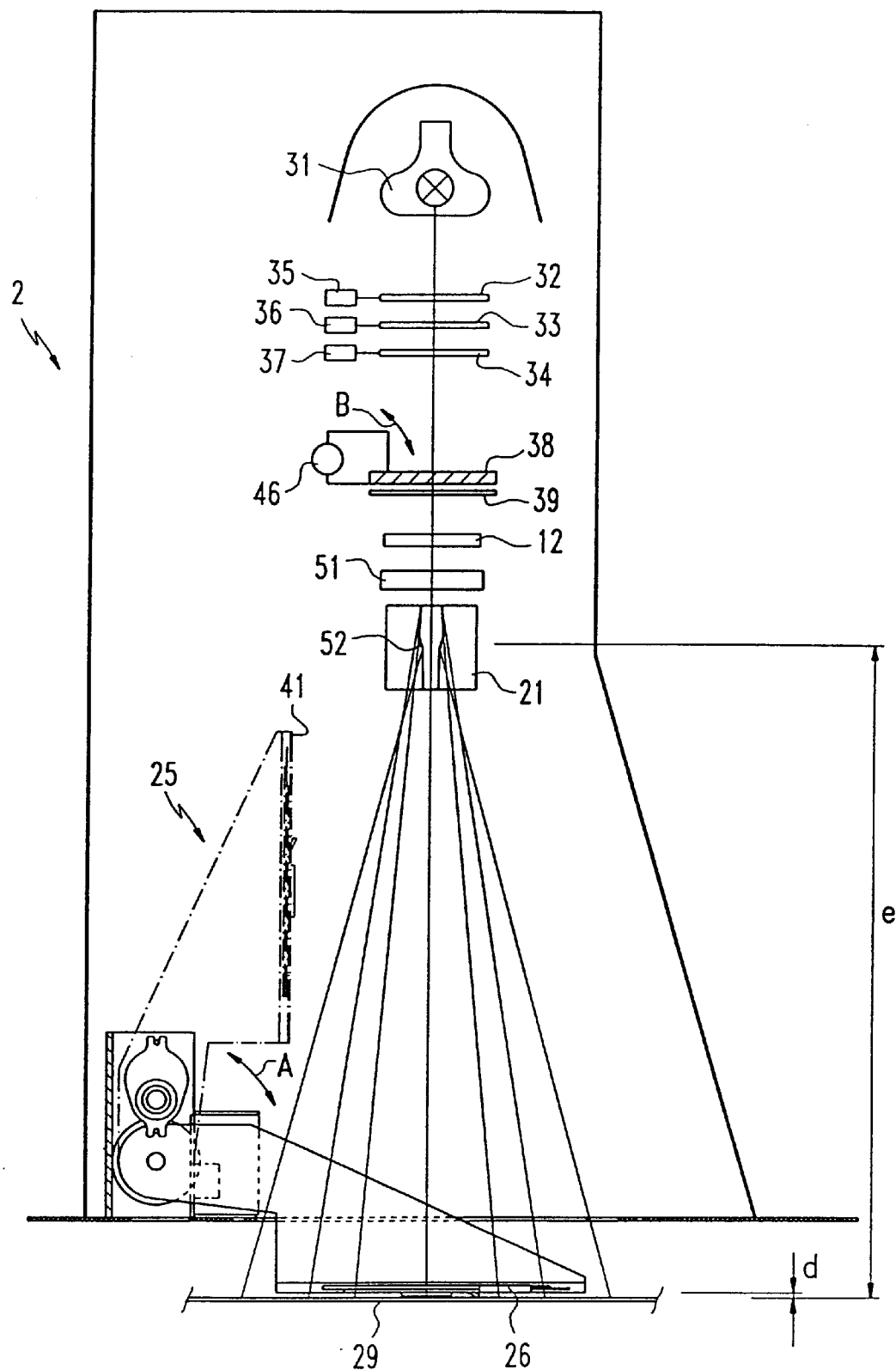
Figure 4:
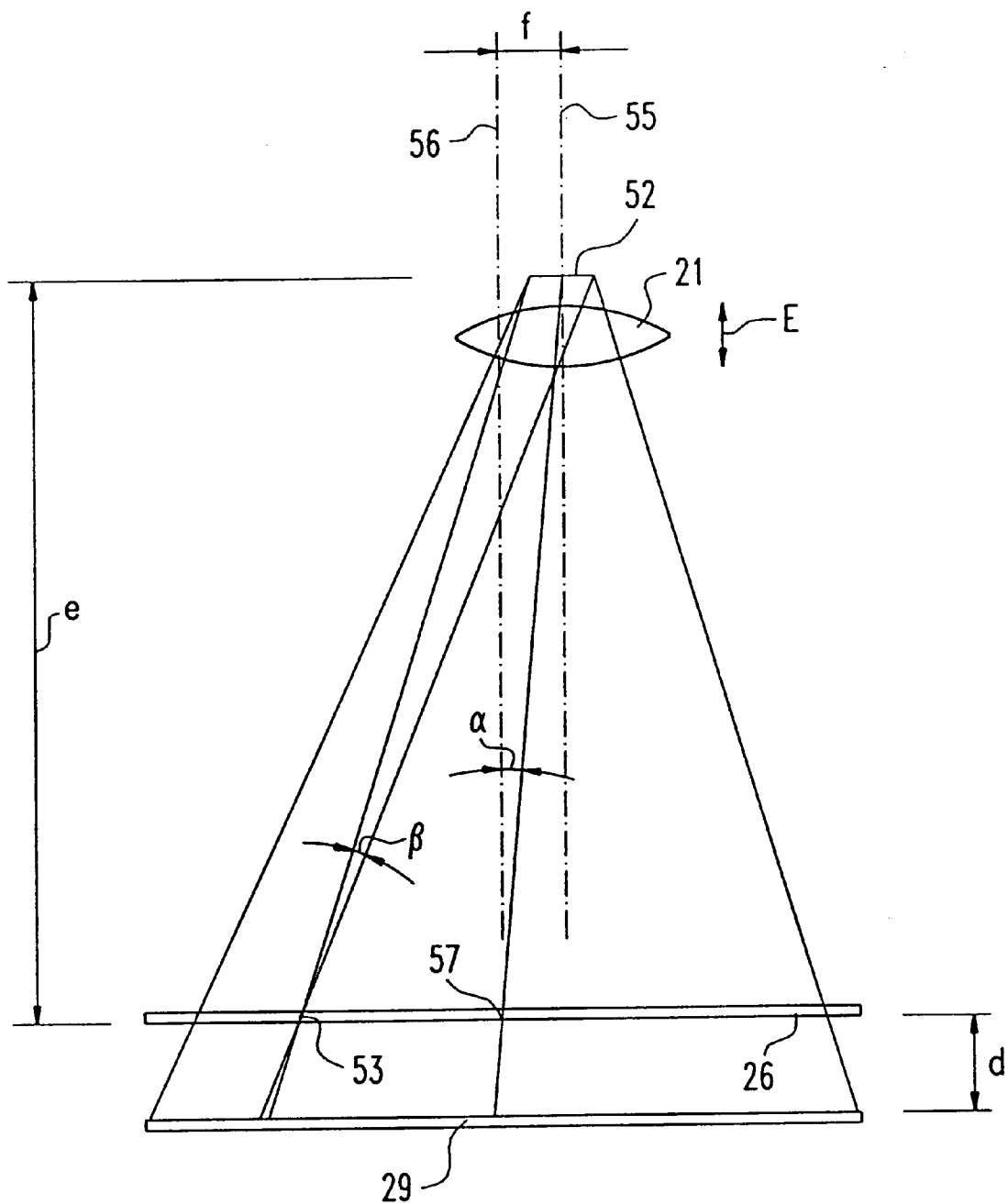
Figure 5:
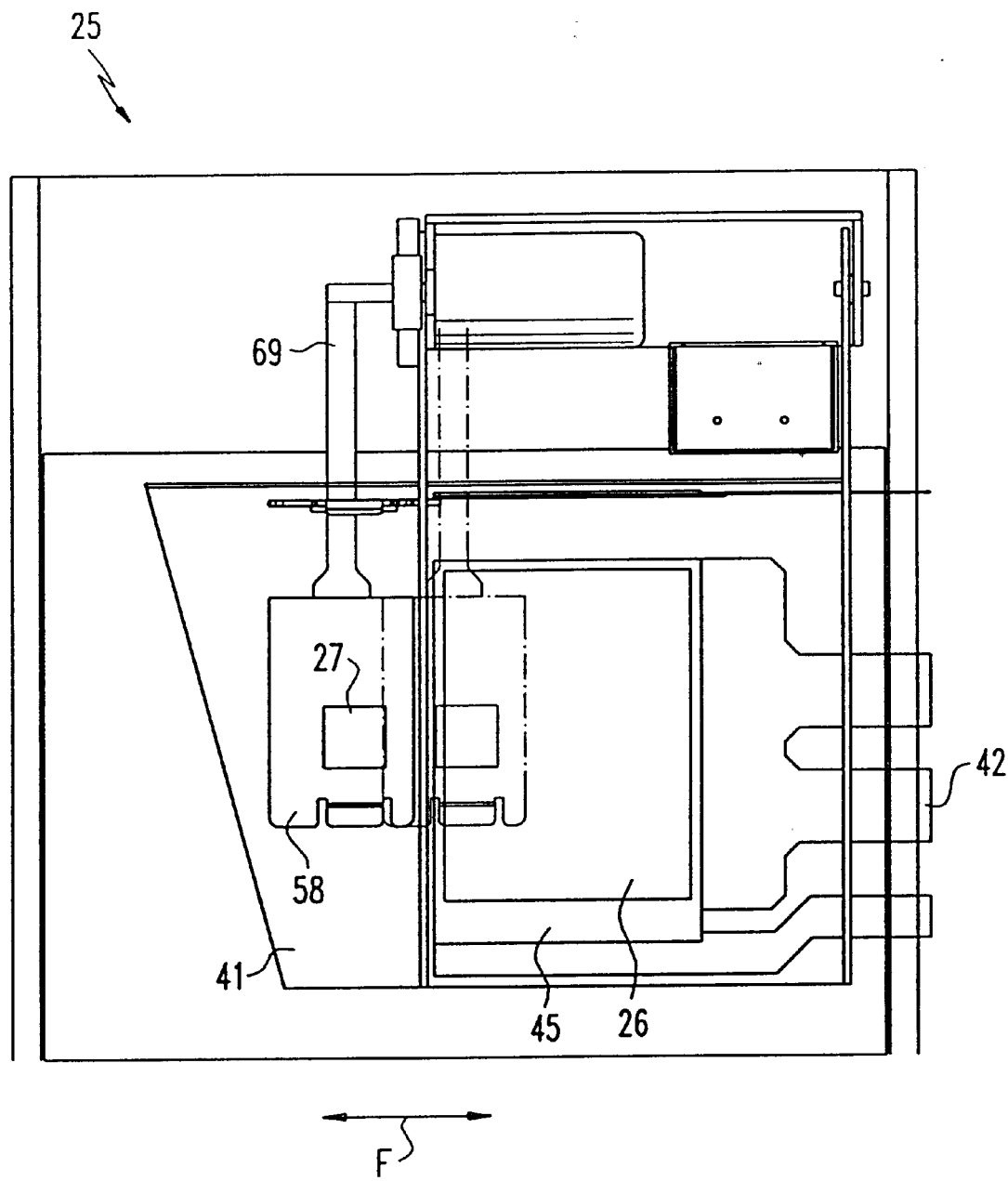
Figure 6:
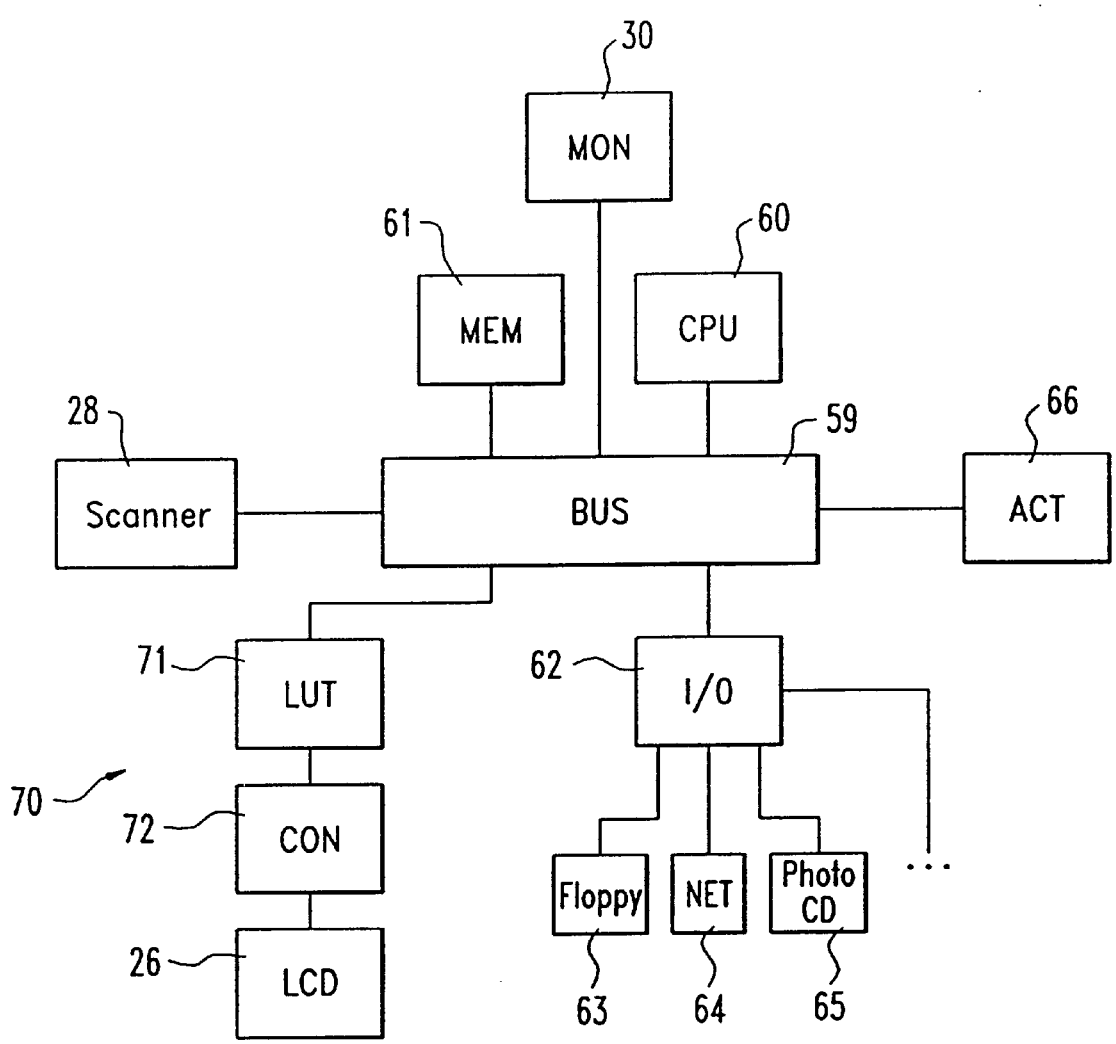

It is shown in:

FIG. 1 is a photographic minilab device;

FIG. 2 a copying station with an integrated imaging signal output device;

FIG. 3 a cross-section through the copying station of FIG. 2 along the line III—III;

FIG. 4 a schematic diagram of the optics for illuminating a display device;

FIG. 5 details of an exposure station;

FIG. 6 a block diagram of electronic components of an exposure device; and

Figure 7A:
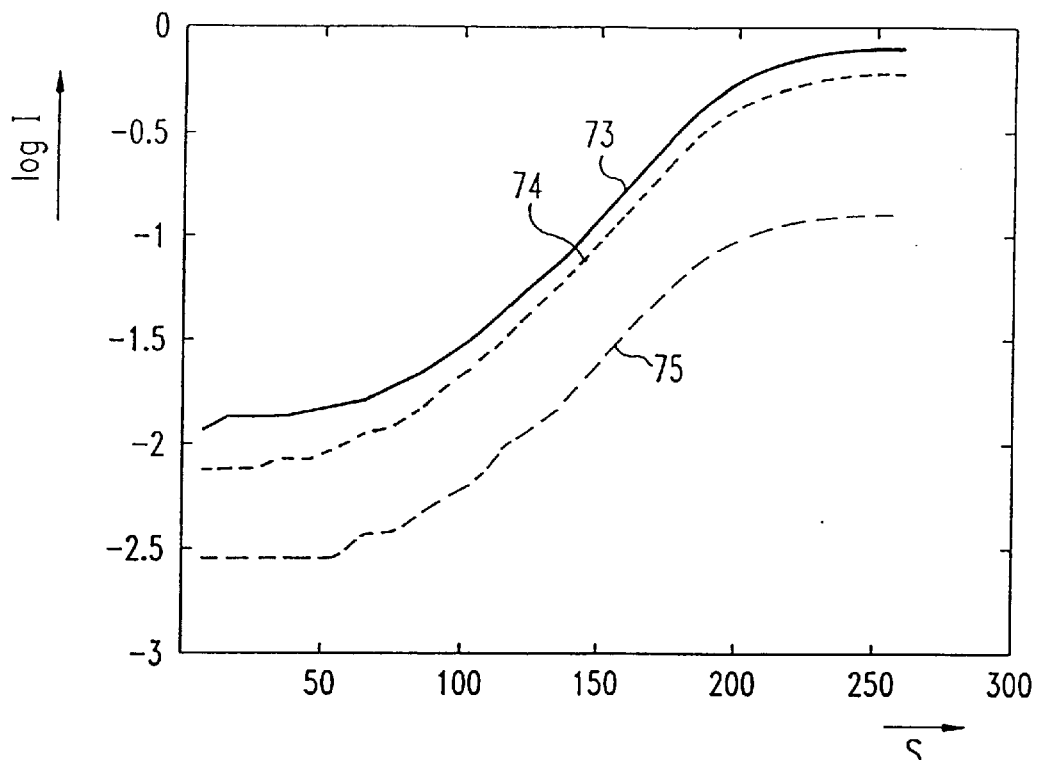
Figure 7B:
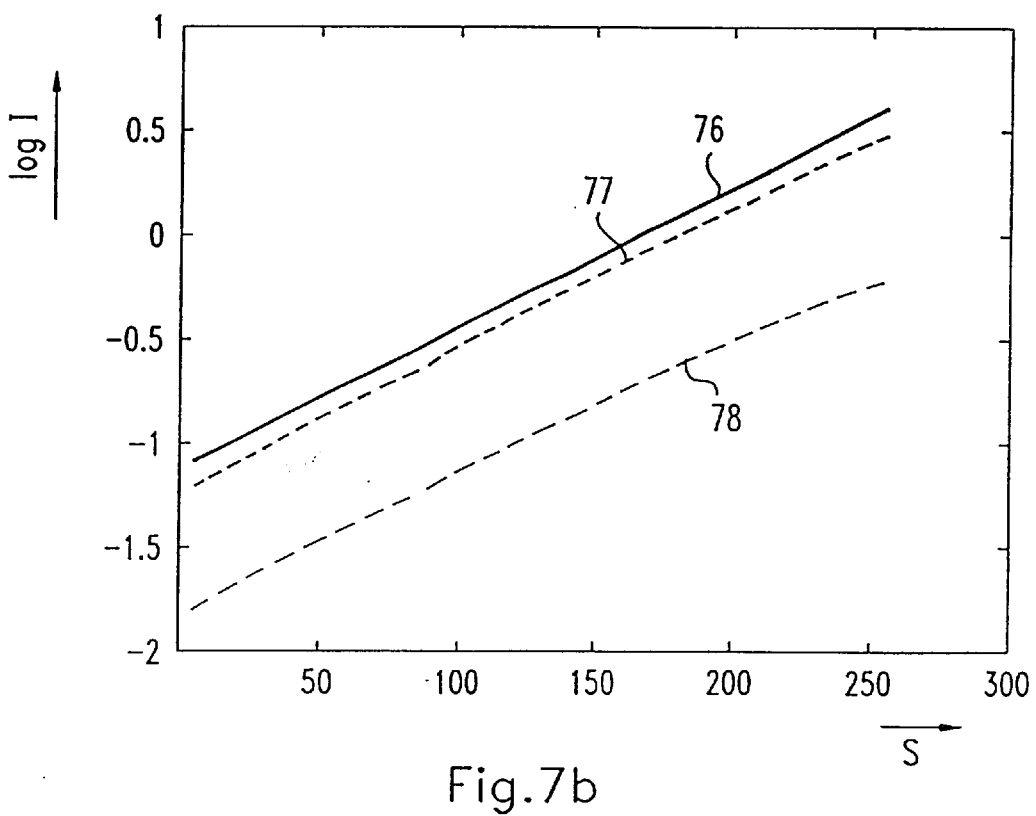
Figure 8:
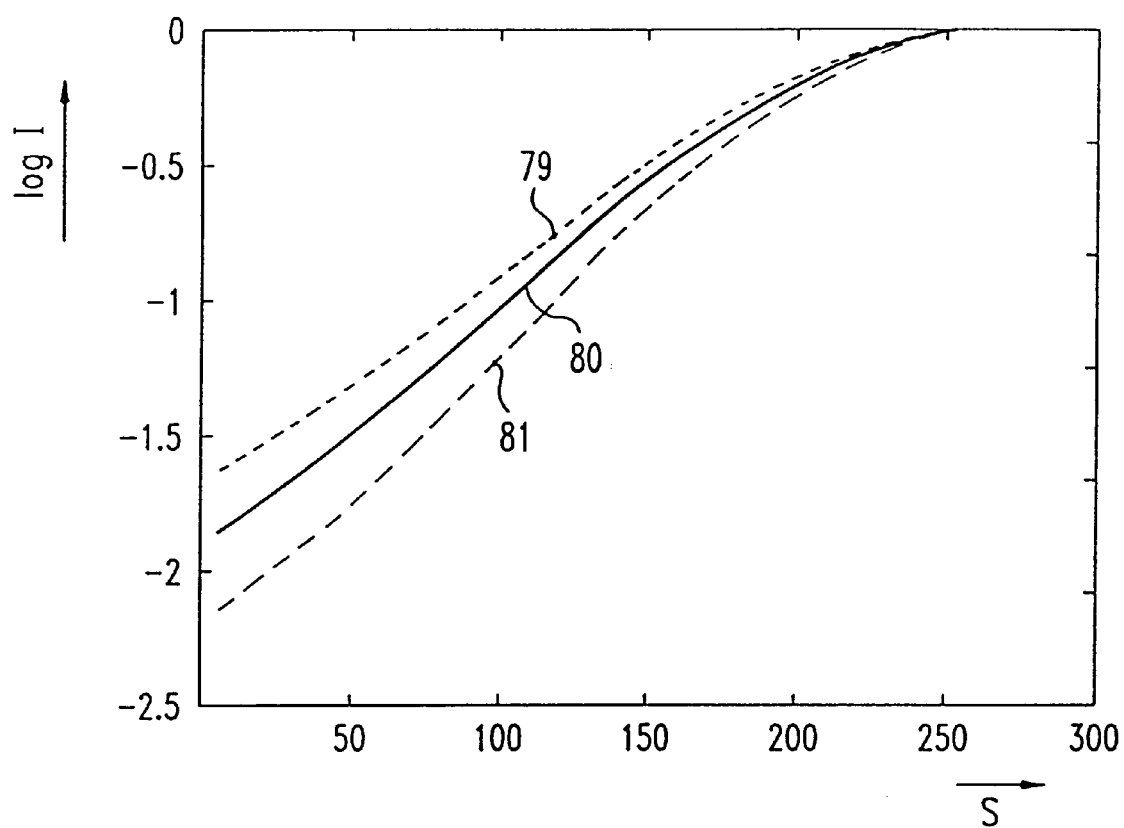

FIGS. 7a, 7b and 8 transfer functions of a liquid crystal arrangement.

DETAILED DESCRIPTION OF THE PRESENTLY PREFERRED EMBODIMENTS

Referring now to FIG. 1, there is shown a photographic minilab device adapted to perform a photographic finishing process essentially automatically. The device includes all essential components required for producing photographic prints. The device includes a film developing section 1, a photographic copying station 2 and a paper developing section 3. An exposed film 10 to be developed is conveyed to the film developing section 1. This section provides developer reservoirs 4 for developing the film. After development, the film 10 passes an intermediates rinse reservoir 5, a reservoir 6 for bleach-hardening and several reservoirs 7 for a final rinse. The film 10 is subsequently dried with warm air in a dryer 8. A film transfer station 9 conveys the developed film 10 to the copying station 2. An intermediates storage device 19 evens out different film transport speeds between the film developing section 1 and the copying station 2. Individual films 24 that are already developed, can also be conveyed to the copying device 2 directly at the film transfer station 9.

In the copying station 2, the film 10 and 24, respectively, passes through a copying stage 12. In the copying station 2, the film is first electronically scanned pixel by pixel with a scanner 28, and the copying data are calculated. The film is subsequently transported in the reverse direction through the copying station 2. Each individual image is then copied on photographic paper 29 according to the calculated copying data. An illuminator 11 illuminates the film 10, an objective 21 forms a sharp image of a copy master to be copied on a paper stage 13. The photographic color negative paper 29 is unwound from one of the two paper cassettes 14 or 15 and passes through the paper stage 13. The objective 21 is secured to a housing section 22 of the copying station 2 with a bayonet lock 23. The objective 21 is located in a light well 20 of the copying station 2.

After the color negative paper 29 is exposed, the paper passes through several chemical treatment baths 16 and is subsequently dried in a dryer 17. The finished and cut paper prints exit the minilab at an output and collection unit 18.

Located inside the copying station 2 is an exposure station 25 for outputting electronic imaging signals. The exposure station includes a display element consisting of a liquid crystal display (LCD) 26. The exposure station is pivotally supported inside the copying station 2 and can be moved back and forth between an exposure position that is parallel to a plane of the paper stage 13, and a rest position in which the LCD 26 is perpendicularly tilted away from the paper stage 13 and outside the illumination beam path. In FIG. 1, the rest position is indicated with dashed lines and the exposure position with solid lines.

In the exposure position, the liquid crystal display 26 is position so close to the paper stage 13 and the photographic paper 29, respectively, that images which are displayed on the liquid crystal display can be exposed in sharp focus on the photographic paper 29 without the need for additional intervening optical imaging components. The imaging signals can be acquired either with the scanner 28 that is integrated with the minilab, or with an external scanner. The imaging signals can also be supplied by other image sources, such as a photo CD, a floppy disk or can be obtained from other computers via an external data network. In particular, the imaging signals can be supplied by a so-called index print composer that assembles all individual images of a photographic film into a common index print, together with corresponding information, such as text, logos and the like.

Before or during the time the images are exposed through the liquid crystal display 26 on the photographic paper 29, an operator can observe the images on a monitor 30. The images displayed on the monitor are produced by special electronic image processing means so that the resulting image resembles as closely as possible the final image produced on the photographic paper 29. In the present embodiment, the image displayed on liquid crystal display 26 is illuminated by the illuminator 11, with a beam of light passing through the objective 21 in such a way that the desired image is produced on the photographic paper 29.

FIG. 2 illustrates a copying station for copying photographic films 24 and for outputting electronic imaging signals via the exposure station 25. To copy the photographic films 24 in a conventional manner, the liquid crystal exposure station 25 is tilted upwards along the direction A into a position shown with dashed lines. For outputting electronic imaging signals, the exposure station 25 is tilted into the lower position shown as solid lines. In the latter case, no photographic film 24 is inserted. Instead, the film 24 is pulled out of the copying station in the direction D.

The illuminator 11 of the copying station includes a halogen lamp 31, a filter arrangement including a yellow filter 32, a magenta filter 33 and a cyan filter 34 which can be tilted along a direction C in and out of the beam path of the light emitted by lamp 31 by separately actuatable rotating magnets 35, 36 and 37. A scattering disk 38 that can be tilted along a direction B, is positioned below the color filters 32, 33, 34. The scattering disk causes the angular distribution of the light to spread, i.e. the light to become softer. The scattering disk can be tilted automatically with the drive motor 46. An additional thin scattering foil 39 which is permanently installed in the illuminating well of the illuminator 11, is located below the scattering disk 38. The scattering foil 39 spreads the light somewhat less than the scattering disk 38.

A zoom objective 21 is designed so as to provide in the plane of the copying paper 29 a sharp image of the pixels that are located in the plane of an inserted film 24. A predetermined exposure time is precisely maintained for each particular color print and each of the color filters 32, 33, 34. The shutter 51 prevents external light from entering the light well 20 before and after the exposure, in particular when the photographic paper is advanced.

The exposure station 25 can be tilted along the direction A inside the illumination well 47 with a drive or a DC motor. The exposure station 25 is mounted via a swivel arm 43 and a pivot axis 44 that is affixed to the housing 48 of the copying station 2. A mounting plate 41 to which a frame 45 for the liquid crystal display 26 and the test negative 27 is attached, is rigidly secured to the swivel arm 43. A flexible light-tight end piece 50 is secured to the side of it mounting plate 41 adjacent to the beveled side 54 of the housing 48. The end piece 50 can be bent around the edge 67 of the mounting plate 41.

The frame 45 and the mounting plate 41 also light-tight. The frame 45 together with the mounting plate 41 form a mask for the liquid crystal display 26. The mounting plate 41 is a movable exposure stage.

The transmission of the liquid crystal display 26 can be controlled pixel by pixel via a ribbon cable. The liquid crystal display 26 has an active area of approximately 118×89 mm and a resolution of 1024×768 pixels and can be modulated to provide a contrast ratio of 1:150 in 256 gray levels (8 bit). The optimal contrast ratio is obtained by illuminating the liquid crystal display with parallel light having an angle of 5° with respect to the surface normal of the display.

The liquid crystal display 26 is illuminated with the light source 31 through the zoom objective 21. In this embodiment, the illumination deviates from an ideal parallel light bundle and is conical, i.e. the surface area of the liquid crystal display is illuminated with different irradiation angles.

The copying station 2 can be operated in two operation modes: in a conventional copying mode and in a mode to output electronic imaging signals.

In the conventional copying mode, a developed photographic film 24 is inserted in the copying station 2 and advanced in the direction D. Each copying master 49 of the film 24 is scanned pixel by pixel with an optoelectronic scanner 28. The scanner 28 can be a charge-coupled device (CCD) or an arrangement of diodes. Color filters can be inserted as required. The scanner 28 scans each image master in three primary colors. Light intensities for the copying process are calculated from the scanned signals, the image master is positioned on the copying stage 12 and copied on the photographic paper 29 at three exposure times, possibly of different duration, with the three color filters 32, 33, 34 inserted. During the copying process, the ground glass disk 38 is pivoted into the illumination beam path, providing a relatively diffuse, i.e. a sofi copying light. During the standard copying process, the exposure device 29 is tilted to the side and moved out of the beam path, as shown in FIG. 2 with dashed lines. Each image master can then be readily copied on the photographic paper 29. The flexible end piece 50 of the mounting plate 41 is bent around the edge 67 and is flush with the lateral bounds 68 of the light well 20 and the housing 48, respectively.

Some print orders may request an index print from the developed film. In this case, the imaging signals of each image master 49 that are produced by the scanner 28, are stored in a temporary memory. After all image masters 49 of the film 24 are scanned, additional information, such as the number of the images, additional text and the like, are added to the imaging signals. The additional information can also be opto-electronically scanned from the film, read from a magnetic layer disposed on the film or can be provided by another source of information. The electronically composed index picture is then exposed onto the photographic paper 29 after the individual images of the image master 49 have been exposed. The exposure device 25 is here moved into the position indicated with the solid lines in FIG. 2. The scattering disk 38 in the illumination well 47, on the other hand, is rotated upwards, i.e. into an area outside the beam path. The image is exposed sequentially in three steps, with the liquid crystal display 26 displaying respective partial images in black and white: first, only the blue partial image of the index print is displayed on the liquid crystal display 26. This image is exposed with blue light by tilting the yellow filters 32 out of the beam path, while the filters 33 and 34 remain inserted in the beam path.

After the blue exposure, the LCD displays the green partial image which is exposed with green light. Finally, the red partial image is displayed on the LCD and exposed with red light.

It has been found that an imaging surface area on the liquid crystal display of at least 50×40 mm is advantageous for producing sufficiently large index prints of good quality. A surface area of 118 mm×89 mm is preferred. With copying paper 29 coming in widths of 3.5", 4", 5" and 6", the total length of the photographic film 24 used to produce the index prints is advantageously subdivided into two classes. In a first class (e.g. a film format 135 with up to 28 pictures), index prints can be produced with the liquid crystal display 26 in a single exposure. Longer films with more pictures, however, have to be exposed in two exposure operations. The index print is then subdivided into two half-images that are sequentially copied on the copying paper 29, with an intervening paper transport step in the direction G transversely to a lateral side of the image. This generates index prints with an area twice as large as the display area of the liquid crystal display 26. The number of pictures on the film 24 and/or the format of the picture that is to be produced, will determine if a picture on the paper 29 is produced in one or two exposure operations. This applies to index prints as well as to the output of individual images provided in electronic form.

FIG. 3 shows a cross-section through FIG. 2 along the line III—III. The illuminator is shown in the two positions outside and inside the light beam path. In the second position, i.e. inside the beam path, the liquid crystal display 26 is in almost direct contact with the photographic paper 29, separated by a distance d of only 5 mm. The LCD 26 and the photographic paper 29 can also be separated by a greater distance, e.g. by 6, 7, 8 and even 10 mm or may also be in direct contact with each other. To prevent the paper 29 from being scratched when the paper is advanced, the LCD 26 will have to be temporarily raised. The distance d, however, should not be too large, because otherwise the picture produced on the photographic paper 20 by the LCD 26 would become blurred. The LCD 26 is illuminated by the halogen lamp 31 through the zoom objective 21 and the filters 32, 33, 34 and the scattering foil 39. The exit pupil 52 of the objective 22 is located at a distance e of approximately 420 mm above the plane of the copying paper 29.

Ideally, the liquid crystal display 26 is illuminated with parallel light. In the present embodiment, however, the illumination is different from the ideal situation. The liquid crystal display is illuminated with a conical light bundle whose irradiation angle varies locally across the area of the liquid crystal display 26.

FIG. 4 shows the optical features of the arrangement of FIG. 2. The objective 21 causes the liquid crystal display 26 to be illuminated with approximately conical light. The center 57 of the liquid crystal display 26 is shifted to the left relative to the optical axis 55 by a distance f. The light then irradiates the center 57 of the liquid crystal display 26 at an angle $\alpha=5°$. The contrast ratio that can be achieved by the images displayed on the LCD 26, is therefore maximal in the center of the LCD 26 and decreases slightly towards the edges. The axis 56 represents the mid-perpendicular of the liquid crystal display 26. The divergent beam path and the separation d between liquid crystal display 26 and the photographic paper 29 causes each pixel 53 that is displayed on the display 26, to be exposed slightly enlarged on the photographic paper 29. This divergence is advantageous for exposing image areas with a high optical density since the pixels exposed on the paper then overlap slightly. The divergence angle $\beta$ depends on the size of the exit pupil 52 of the objective 22 and on the distance between the exit pupil 52 and the display 26. By displacing several elements of the zoom objective 21 along the direction E, the divergence angle $\beta$ of the arrangement described above can be varied over a range between approximately 1 and 2°. The zoom objective 21 of the photographic copying device described above can be used in two different ways: on one hand, in a standard copying process to provide different magnification and, on the other hand, to adjust the divergence of the illuminating light when outputting electronic imaging signals with the display device 26.

FIG. 5 illustrates details of the illuminator 25. The illuminator 25 of this embodiment is particularly suited for application in a photographic copying apparatus. In front of the mask 45 of the illuminating device 25, there is positioned in addition to the display device 26 a test negative 27 which is supported by a frame 58. The test negative 27 is used to calibrate the copying settings of the photographic copying apparatus. The test negative 27 is copied on the photographic material 29 by a contact copying process. The copied image is subsequently photochemically developed and densitometrically measured.

To move the test negative 27 into a copying position of the photographic copying apparatus from a test mode, the test negative is actively rotated with the swivel arm 69 downwardly towards the paper 29 and simultaneously displaced linearly along the optical axis 55 in the direction F. The two motions can be carried out synchronously with a single drive using a suitable guide mechanism. In other words, a combined rotation-translation motion is executed. FIG. 5 shows the rest position of negative 27 after the test negative is passively guided (left side, solid lines), as well as the position of the negative in the test mode (right side, dotted lines) after the test negative is actively rotated.

In the test exposure mode, the test negative 27 is positioned proximate to the optical axis 55. In this mode, the LCD 26 is rotated out of the illumination beam path so as not to obstruct the illumination of the test negative 27.

In the rest position attained by passive guiding, the test negative 27 is positioned below the mounting plate 41 so as not to interfere with a LCD exposure. For this purpose, the mounting plate 41 illustrated in FIG. 2 has a raised portion 82 adapted to receive the test negative 27 in the rest position.

FIG. 6 shows a block diagram of important electronic components of the entire apparatus. The components are connected to each other via a central data line 59 (Bus). A central computing and control unit 80 (CPU) controls the process flow. The imaging signals produced by the scanner 28 or obtained from external image sources are stored in a memory 61 (MEM). A control card 66 controls all actuators, such as rotating magnets, stepper and DC motors for positioning, in particular rotating and translating the components. Data can be inputted and outputted via an input/output interface 62 from a disk drive 63, a network card 64, a photo CD, a keyboard, and mouse, external scanners, and the like.

The imaging signals are modified for controlling the liquid crystal display 26. This modification can be implemented via stored lookup tables and the central computing stage 60 or—as illustrated in FIG. 6—by way of serially connected pipeline image processing components 70. As shown in the embodiment illustrated in FIG. 6, the imaging signals are modified first by a lookup table 71 and then by a contrast modification stage 72. The role of these two components will be discussed in the following with reference to FIGS. 7 and 8.

FIG. 7a shows measured relative intensities I of light having different colors and transmitted through the liquid crystal display 26. The display is controlled by imaging signals S having digitized values between 0 and 255. Curve 73 represents the intensity of red light when the cyan filter 34 is rotated out of the copying beam path. Curve 74 shows the transmitted green light intensity when the magenta filter 33 is rotated out, and curve 75 shows the respective intensity of the blue light when the yellow filter 32 is rotated out. It can be seen from the characteristic transmission curves 73, 74 and 75 that the liquid crystal display 26 has a non-linear characteristics. The image processing components described above are adapted to equalize these non-linear LCD curves, i.e. to represent the input signals S of the LCD display as a linear function on a logarithmic intensity scale. The lookup tables (LUT) of the image processing stage 71 therefore include separate table functions for each spectral range that are the inverse of the characteristic curves 73, 74, 75.

FIG. 7b illustrates the effect of the image processing stage 71. The mathematical condition for the lookup tables stored in the stage 71 is:

$$L(S)=f^{-1}(g(S)),$$

wherein L is the function stored in the lookup table, g is a desired—in particular linear—density curve of the display 26 and f is the characteristic curve of display 26 determined according to FIG. 7a. The imaging signals of the LCD 26 according to the curves 76 for cyan, 77 for magenta and 78 for yellow can be represented by linear functions after multiplication with the respective lookup tables received from system bus 59.

The imaging signals are modified further inside the image processing stage 17 to adapt the imaging signals to a predetermined recording material 29. The signals are matched with the respective density characteristics of the recording material. The imaging signals can also be converted from negative to positive and vice versa.

FIG. 8 shows different intensity curves that can be measured at the center of the image (curve 81), at the left edge of the display 26 (curve 80) and at the right edge of the image (curve 79) with an arrangement according to FIG. 2. The condition stated with reference to FIG. 4, i.e. that ideally the light irradiates the liquid crystal display 26 at an angle of exactly 5°, is therefore only satisfied when the image is produced according to curve 81. Consequently, the contrast to the center of the image is greater than at the edges of the image.

To even out contrast variations, different sections, in particular different rows or different columns, of the display 26 are controlled differently when exposed with the image processing stage 17 shown in FIG. 6. This is accomplished by the contrast stage 72 which modifies the imaging signals depending on the position of the pixels relative to the image center and thus increases or decreases the contrast. The stage 72 therefore has the effect of providing a uniform contrast across the entire image area of the display 26.

The invention has been described with respect to several embodiments, in particular with reference to an integrated application in a photographic minilab device. However, in particular the exposure device 25 can also be used in combination with other devices or alone to output electronic imaging signals. The described photographic color negative paper can, of course, be replaced with other light-sensitive recording materials, such as color positive paper or a transparent light-sensitive material or a light-sensitive printing plate. A transmissive solid-state display, for example a display based on PLZT crystals or a so-called light valve arrangement, or a micro-shutter arrangement, can also be used instead of the liquid crystal display, as long as the size and resolution of the respective display elements is suitable for the desired application. These different embodiments are known to those skilled in the art. In a configuration for contact exposure, the area display elements can also be replaced by linear display elements, wherein two-dimensional images are produced by exposing and simultaneously advancing the recording material row by row. Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A process for output of electronic imaging signals on a light-sensitive recording material (29) in a photographic copying apparatus (2) adapted for copying an image master (49) of a photographic film (24) on light-sensitive recording material (29), comprising the steps of
    (a) controlling a transmissive display element (26) by the imaging signals;
    (b) passing a beam of light from a light source (31) first through an objective (21) and then through the display element (26) in the direction of the light-sensitive recording material (29);
    (c) upon obtaining the image output, positioning the display element (26) adjacent to the recording material (29) that a sharp image is produced on the recording material (29), without necessitating positioning an optical focusing means between the display element (26) and the recording material (29);
    (d) upon obtaining the imaging signals output, movably positioning the display element (26) in the same optical beam path in which an image master (49) is also positioned during the copying operation of the image master;
        wherein the electronic imaging signals includes image information comprised in the image master (49) that can be copied with the photographic copying apparatus (2), and using the light source (31) to irradiate the image master (49) in the direction of the light-sensitive recording material (29).

2. A process for output of electronic imaging signals on a light-sensitive recording material (29) in a photographic copying apparatus (2) adapted for copying an image master (49) of a photographic film (24) on light-sensitive recording material (29), comprising the steps of
    (a) controlling a transmissive display element (26) by the imaging signals;
    (b) passing a beam of light from a light source (31) through the display element (26) in the direction of the light-sensitive recording material (29);
    (c) upon obtaining the image output, positioning the display element (26) adjacent to the recording material (29) that a sharp image is produced on the recording material (29), without necessitating positioning an optical focusing means between the display element (26) and the recording material (29);
    (d) upon obtaining the imaging signals output positioning the display element (26) in the same optical beam path in which an image master (49) is also positioned during the copying operation of the image master;
        wherein the electronic imaging signals includes image information comprised in the image master (49) that can be copied with the photographic copying apparatus (2), and using the light source (31) to irradiate the image master (49) in the direction of the light-sensitive recording material (29); and tilting the display elements (26) into a illuminating position for providing the output of the image.

3. The process according to claim 2, further comprising the step of illuminating the display element (26) by a white light source (29) and further illuminating sequentially for a set time with three primary colors by interposing optical filters (32, 33, 34).

4. The process according to claim 3, further comprising the step of providing an index image wherein a predetermined number of image masters of a photographic film (10, 24) is provides by output in a predetermined arrangement.

5. The process according to claim 4, wherein, depending on the number and/or the format of the index image to be produced, the index image is produced at least in one exposure operation, and wherein in the event of several exposure operations, the recording material is transported transversely to a lateral side of the image between the exposure operations in such that the two exposure operations do not overlap at all or overlap only in a predetermined area of the recording material.

6. An apparatus for output of electronic imaging signals on a light-sensitive recording material (29) in a photographic copying apparatus (2) adapted for copying an image master (49) of a photographic film (24) on light-sensitive recording material (29), comprising a two-dimensional transmissive display element (26), that can be controlled by the imaging signals; and a light source (31) for irradiating the display element (26) through an objective in the direction of the recording material (29), wherein when an output for the image is provided, the display element (26) is positioned adjacent to the recording material (29) so that a sharp image is produced on the recording material (29), without positioning focusing optical means between the display element (26) and the recording material (29), and when an output for the imaging signals is provided, the display element (26) can be movably positioned in the same optical beam path in which an image master (49) is positioned when the image master is copied, wherein the electronic imaging signals comprise image information comprised in the image master (49) that can be copied with the photographic copying apparatus (2), and the light source (31) for irradiating the display element (26) is arranged in such a way that the light source (31) can also be used to illuminate the image master (49).

7. An apparatus for output of electronic imaging signals on a light-sensitive recording material (29) in a photographic copying apparatus (2) adapted for copying an image master (49) of a photographic film (24) on light-sensitive recording material (29), comprising a two-dimensional transmissive display element (26), that can be controlled by the imaging signals; and a light source (31) for irradiating the display element (26) in the direction of the recording material (29), wherein when an output for the image is provided the display element (26) is positioned adjacent to the recording material (29) so that a sharp image is produced on the recording material (29), without positioning focusing optical means between the display element (26) and the recording material (29), and when an output for the imaging signals is provided, the display element (26) can be positioned in the same optical beam path in which an image master (49) is positioned when the image master is copied, wherein the electronic imaging signals comprise image information comprised in the image master (49) that can be copied with the photographic copying apparatus (2), and the light source (31) for irradiating the display element (26) is arranged in such a way that the light source (31) can also be used to illuminate the image master (49); and comprising a tilting device (40, 43, 44) for moving the display element (26) into an exposure position.

8. The device according to claim 7, wherein the tilting means (40, 43, 44) comprise a drive motor (40) and a light blocking plate (41).

9. The device according to claim 8, further comprising a transmissive test image (27).

10. The device according to claim 9, wherein the test image (27) is secured to a holder (69) which is tiltable together with a plate (41) between a position outside a direct beam path of a light source (31) and a rest position within the beam path, as well as tiltable by a combined rotation-translation motion, between the position outside the beam path and a copying position within the beam path, in which copying position the test image (27) can be copied to the recording material (29).

11. The device according to claim 10, wherein the display element (26) has dimensions of at least 50×40 mm and a resolution of at least 500×300 pixels.

12. The device according to claim 10, wherein the display element (26) is secured in a wraparound, light blocking frame (45).

13. A photographic copying apparatus, comprising an exposure device (25) for output of electronic imaging signals on a light-sensitive recording material (29) in a photographic copying apparatus (2) adapted for copying an image master (49) of a photographic film (24) on light-sensitive recording material (29), comprising a two-dimensional transmissive display element (26), being controlled by the imaging signals; and a light source (31) for irradiating the display element (26) through an objective in the direction of the recording material (29), wherein when an output for the image is provided, the display element (26) being movably positioned adjacent to the recording material (29) that a sharp image is produced on the recording material (29), without positioning focusing optical means between the display element (26) and the recording material (29), and when an output for the imaging signals is provided, the display element (26) can be positioned in the same optical beam path in which an image master (49) is positioned when the image master is copied, wherein the electronic imaging signals comprise image information comprised in the image master (49) that can be copied with the photographic copying apparatus (2), and the light source (31) for irradiating the display element (26) is arranged in such a way that the light source (31) can also be used to illuminate the image master (49).

14. The photographic copying apparatus according to claim 13, further comprising a) the objective (22) being disposed between a stage (12) adapted to receive a copy master (24), and the recording material (29);

b) a scattering foil (39) disposed between the light source (31) and the zoom objective (2); and c) the light source (31), the zoom objective (22) and the display element (26) being adjusted relative to each other such that the position and the size of the exit pupil (52) of the objective (22) results in a divergent illumination of the display element (26) with a predetermined divergence angle.

15. A photographic copying apparatus, comprising an exposure device (25) for output of electronic imaging signals on a light-sensitive recording material (29) in a photographic copying apparatus (2) adapted for copying an image master (49) of a photographic film (24) on light-sensitive recording material (29), comprising a two-dimensional transmissive display element (26), being controlled by the imaging signals; and a light source (31) for irradiating the display element (26) in the direction of the recording material (29), wherein when an output for the image is provided, the display element (26) can be positioned so close to the recording material (29) that a sharp image is produced on the recording material (29), without positioning focusing optical means between the display element (26) and the recording material (29), and when an output for the imaging signals is provided, the display element (26) being positioned in the same optical beam path in which an image master (49) is positioned when the image master is copied, wherein the electronic imaging signals comprise image information comprised in the image master (49) that are copied with the photographic coping apparatus (2), and the light source (31) for irradiating the display element (26) is arranged such that the light source (31) are also be used to illuminate the image master (49), and a zoom objective (22) being disposed between a stage (12) adapted to receive a copy master (24) and the recording material (29);

a scattering foil (39) disposed between the light source (31) and the zoom objective (2);

the light source (31), the objective (22) and the display element (26) being adjusted to each other such that the position and the size of the exit pupil (52) of the objective (22) results in a divergent illumination of the display element (26) with a predetermined divergence angle; and wherein the display element (26) is displaced laterally relative to the optical axis extending through the light source (31) and the zoom objective (22).

16. The device according to claim 10, wherein the display element (26) has dimensions of 118×89 mm and a resolution of 1024×768 pixels.

* * * * *